United States Patent
Deng et al.

(10) Patent No.: US 9,837,898 B2
(45) Date of Patent: Dec. 5, 2017

(54) PEAK-VALUE CURRENT MODE CONTROL FOR POWER CONVERTERS

(71) Applicant: Silergy Semiconductor Technology (Hangzhou) Ltd., Hangzhou (CN)

(72) Inventors: Jian Deng, Hangzhou (CN); Xiaoru Xu, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 0 days.

(21) Appl. No.: 15/361,188

(22) Filed: Nov. 25, 2016

(65) Prior Publication Data
US 2017/0155319 A1    Jun. 1, 2017

(30) Foreign Application Priority Data
Nov. 26, 2015 (CN) .......................... 2015 1 0843252

(51) Int. Cl.
*H02M 3/157* (2006.01)
*H02M 1/08* (2006.01)
(Continued)

(52) U.S. Cl.
CPC .......... *H02M 3/157* (2013.01); *H02M 1/083* (2013.01); *H02M 3/156* (2013.01); *H05B 33/00* (2013.01)

(58) Field of Classification Search
CPC ............. H02M 2001/0009; H02M 2001/0012; H02M 1/083; H02M 3/157
(Continued)

(56) References Cited

U.S. PATENT DOCUMENTS

| 6,269,012 B1 * | 7/2001 | Kusakabe ............. H02M 7/217 323/239 |
| 7,215,107 B2 | 5/2007 | Djenguerian et al. |

(Continued)

FOREIGN PATENT DOCUMENTS

| CN | 1913316 A | 2/2007 |
| CN | 2886912 Y | 4/2007 |

(Continued)

OTHER PUBLICATIONS

First Office Action from Chinese Patent Application No. 201510843252.5, dated Jul. 27, 2017, 7 pages.

*Primary Examiner* — Jeffrey Sterrett
(74) *Attorney, Agent, or Firm* — Westman, Champlin & Koehler, P.A.

(57) ABSTRACT

The disclosure relates to a control circuit and a control method for a power converter. The power converter comprises a power switch and an inductor being coupled to the power switch. The control circuit controls operation of the power switch to charge and discharge the inductor for generating an inductor current and providing an output current. The control circuit controls the power switch to be turned on when or after an inductor current detection signal is zero, and controls the power switch to be turned off when the inductor current detection signal reaches a peak reference signal or when the power switch has been turned on for a maximum on time. The control circuit also adjusts the maximum on time in accordance with the inductor current detection signal, so that the power converter provides a constant output current to a load. The control circuit operates at a peak-value current mode and maintains the current of the power converter nearly stable without obtaining a compensation signal. The circuit structure is simplified and the number of peripheral components is reduced.

23 Claims, 7 Drawing Sheets

(51) Int. Cl.
*H02M 3/156* (2006.01)
*H05B 33/00* (2006.01)

(58) Field of Classification Search
USPC ................................ 323/282, 283, 284, 288
See application file for complete search history.

(56) References Cited

U.S. PATENT DOCUMENTS

| | | | |
|---|---|---|---|
| 7,359,225 B2 | 4/2008 | Djenguerian et al. | |
| 7,567,070 B2 | 7/2009 | Djenguerian et al. | |
| 7,990,125 B2 | 8/2011 | Djenguerian et al. | |
| 8,143,875 B2 | 3/2012 | Djenguerian et al. | |
| 8,587,284 B2 | 11/2013 | Djenguerian et al. | |
| 8,933,637 B2 | 1/2015 | Deng et al. | |
| 9,125,250 B1* | 9/2015 | Xiong .................. | H02M 3/156 |
| 9,144,125 B2 | 9/2015 | Deng et al. | |
| 9,385,616 B2 | 7/2016 | Deng et al. | |
| 9,654,013 B2 | 5/2017 | Chen et al. | |
| 9,699,838 B2* | 7/2017 | Xu ..................... | H05B 33/0815 |
| 2004/0130360 A1* | 7/2004 | Jonsson ................ | H02M 3/156 |
| | | | 327/112 |
| 2005/0285587 A1* | 12/2005 | Yang ................. | H02M 3/33507 |
| | | | 324/103 P |
| 2008/0088284 A1 | 4/2008 | Weng | |
| 2010/0033146 A1* | 2/2010 | Irissou .................. | H02M 3/156 |
| | | | 323/282 |
| 2012/0217946 A1* | 8/2012 | Ju ........................ | H02M 3/156 |
| | | | 323/285 |
| 2013/0301309 A1* | 11/2013 | Chen ................. | H02M 3/33523 |
| | | | 363/21.12 |
| 2014/0009080 A1* | 1/2014 | Xu ..................... | H05B 33/0815 |
| | | | 315/224 |
| 2014/0239930 A1* | 8/2014 | Wang ...................... | H02M 3/10 |
| | | | 323/284 |
| 2014/0300333 A1* | 10/2014 | Chen ...................... | G01R 19/25 |
| | | | 323/282 |
| 2015/0280592 A1* | 10/2015 | Hu ........................ | H02M 3/156 |
| | | | 363/21.04 |
| 2015/0365004 A1 | 12/2015 | Deng et al. | |
| 2016/0218087 A1 | 7/2016 | Ye | |
| 2017/0155319 A1* | 6/2017 | Deng .................... | H02M 3/157 |

FOREIGN PATENT DOCUMENTS

| | | |
|---|---|---|
| CN | 2907072 Y | 5/2007 |
| CN | 102938617 A | 2/2013 |
| CN | 103023352 A | 4/2013 |
| CN | 103166449 A | 6/2013 |
| CN | 203014675 U | 6/2013 |
| CN | 204257629 U | 4/2015 |
| CN | 104617058 A | 5/2015 |
| CN | 104779804 A | 7/2015 |

* cited by examiner

PEAK-VALUE CURRENT MODE CONTROL FOR POWER CONVERTERS

CLAIM OF PRIORITY

This application claims priority to Chinese Application No. 201510843252.5, filed on Nov. 26, 2015 (published as CN 105281591 A), which is hereby incorporated by reference.

BACKGROUND OF THE INVENTION

Field of the Invention

The present disclosure relates to the field of power supply, and in particular, to a control circuit and a control method for a power converter.

Description of the Related Art

Power converters are widely required to provide a constant current in many applications, for example, in LED lighting field, a constant current is used to drive an LED lamp to maintain its luminous intensity. In a conventional control method, a compensation signal is obtained by calculating an error between the feedback signal of the output current and a reference signal, the compensation signal is used to control the on time period or control the peak value of the inductor current flowing through the inductor in the power switch, thus achieving a current closed-loop control so that a constant current control is obtained.

In the above control method, a compensation capacitor must be introduced in the feedback loop to obtain a stable compensation signal because the ripple of the current is large. However, the compensation capacitor increases the size and cost of the power converter, which is disadvantageous for the circuit integration of the power converter. When the main circuits of the power converter except the compensation capacitor are integrated into a chip, extra pins are required for connecting to the compensation capacitor located outside the chip.

Thus, it is desired to further simplify the control circuit of the power converter in order to reduce the chip size and the number of the peripheral components.

BRIEF DESCRIPTION OF THE INVENTION

In view of this, the disclosure provides a control circuit and control method for a power converter. The control circuit operates at a peak-value current mode, without need for compensation signal, to control the current of the power converter to be stable, so that the circuit structure is simplified and the number of the components is decreased.

According to one aspect of the disclosure, there is provided a control circuit for a power converter, wherein the power converter comprises a power switch and an inductor being coupled to the power switch, the control circuit controls operation of the power switch to charge and discharge the inductor for generating an inductor current and providing an output current, the control circuit controls the power switch to be turned on when or after an inductor current detection signal is zero, and controls the power switch to be turned off when the inductor current detection signal reaches a peak reference signal or when the power switch has been turned on for a maximum on time, wherein the control circuit adjusts the maximum on time in accordance with the inductor current detection signal so that the power converter provides a constant output current to a load.

Preferably, an input voltage of the power converter is a DC input voltage with an amplitude varying in a first cycle, the output current is equivalent to a DC output current which has an equivalent duty ratio and varies in the first cycle, the control circuit adjusts the maximum on time in accordance with the inductor current detection signal, so that the equivalent duty ratio is controlled to be approximately equal to a reference duty ratio.

Preferably, the control circuit comprises: a turn-on control circuit for generating a turn-on signal for turning on the power switch; a comparator for comparing the inductor current detection signal with a peak current reference signal to provide a first control signal; a maximum on-time circuit for generating a maximum on-time signal in accordance with the inductor current detection signal; an OR gate having two input terminal for respectively receiving the first control signal and the maximum on-time signal, and an output terminal for providing an turn-off signal for turning off the power switch; and an RS flip-flop having a set terminal for receiving the turn-on signal and a reset terminal for receiving the turn-off signal respectively, and an output terminal for providing a switch control signal for controlling the power switch.

Preferably, the turn-on control circuit is a zero-crossing detection circuit, which generates the turn-on signal when a zero crossing point of the inductor current detection signal is detected.

Preferably, the switch control signal has a second cycle which is less than the first cycle, the turn-on control circuit generates the turn-on signal when a predetermined time period has elapsed after the zero crossing point of the inductor current detection signal was detected, and maintains a constant ratio of the time period during which the inductor current flows through the load to the second cycle.

Preferably, the turn-on controls circuit comprises: a zero-crossing detection circuit for generating a first turn-on signal when the zero crossing point of the inductor current detection signal is detected; a constant ratio circuit for obtaining the time period during which the inductor current flows through the load in accordance with an inductor current detection signal, obtaining the second cycle in accordance with the switch control signal, and generating a second turn-on signal when the ratio of the time period during which the inductor current flows through the load to the second cycle is a constant value; and an AND gate having two input terminals for respectively receiving the first turn-on signal and the second turn-on signal, and an output terminal for providing the turn-on signal of the power switch.

Preferably, the maximum on-time circuit comprises: a counter circuit which begins to decrement a counter value when the inductor current detection signal increases to a first reference signal, and to increment the counter value when the inductor current detection signal decreases to a second reference signal; a digital-analog conversion circuit for converting the counter value of the counter circuit to an analog signal as the maximum on time; an on-time judgment circuit for comparing the maximum on time with an actual on time of the power switch and generating the maximum on-time signal.

Preferably, the maximum on-time circuit comprises: a clock signal generation circuit for generating a first clock signal during the decrement period so that the counter circuit counts in accordance with the first clock signal, and generating a second clock signal during the increment period so that the counter circuit counts in accordance with the second clock signal.

Preferably, frequencies of the first clock signal and the second clock signal are determined for the reference duty ratio.

Preferably, the reference duty ratio is equal to a ratio of the frequency of the second clock signal to a sum of the frequency of the first clock signal and the frequency of the second clock signal.

Preferably, the maximum on-time circuit further comprises a comparator for comparing the inductor current detection signal with the first reference signal and the second reference signal.

Preferably, the first reference signal and the second reference signal are both equal to one half of the peak reference signal.

Preferably, the first reference signal is equal to the peak reference signal, and the second reference signal is zero.

According to another aspect of the present disclosure, there is provided a control method for a power converter, wherein the power converter comprises a power switch and an inductor being coupled to the power switch, the control circuit controls operation of the power switch to charge and discharge the inductor to provide an inductor current, so that an output current is provided, comprising: controlling the power switch to be turned on when or after an inductor current detection signal is zero, and controls the power switch to be turned off when the inductor current detection signal reaches a peak reference signal or when the power switch has been turned on for a maximum on time, wherein the control method adjusts the maximum on time in accordance with the inductor current detection signal so that the power converter provides a constant output current to a load.

Preferably, the input voltage of the power converter is a DC input voltage with an amplitude varying in a first cycle, the output current is equivalent to a DC output current which has an equivalent duty ratio and varies in the first cycle, at the step of adjusting the maximum on time, controlling the equivalent duty ratio to be approximately equal to a reference duty ratio.

Preferably, the step of controlling the power converter to be turned on comprises: generating a turn-on signal when a zero crossing point of an inductor current detection signal is detected.

Preferably, the switch control signal has an second cycle less than the first cycle, the step of controlling the power switch to be turned on comprises: generating a turn-on signal when a predetermined time period has elapsed after the zero crossing point of the inductor current detection signal was detected, and maintaining a constant ratio of the time period during which the inductor current flows through the load to the second cycle.

Preferably, the step of adjusting the maximum on time comprises: decrementing a counter value when the inductor current detection signal increases to a first reference signal, and incrementing the counter value when the inductor current detection signal decreases to a second reference signal; converting counter value of the counter circuit to an analog signal as the maximum on time; comparing the maximum on time with an actual on time of the power switch and generating the maximum on-time signal.

Preferably, the step of adjusting the maximum on time comprises: generating a first clock signal for decrement so that the counter circuit counts in accordance with the first clock signal, and generating a second clock signal for increment so that the counter circuit counts in accordance with the second clock signal.

Preferably, the step of adjusting the maximum on time comprises: determining frequencies of the first clock signal and the second clock signal for the reference duty ratio.

Preferably, the reference duty ratio is equal to a ratio of the frequency of the second clock signal to a sum of the frequency of the first clock signal and the frequency of the second clock signal.

Preferably, the first reference signal and the second reference signal are both equal to one half of the peak reference signal.

Preferably, the first reference signal is equal to the peak reference signal, and the second reference signal is zero.

The control circuit according to the embodiment of the disclosure generates a switch control signal in accordance with an inductor current detection signal, for turning on and off the power switch. The power converter operates in critical conduction mode or in discontinuous conduction mode under control of a peak current, which adjusts or maintains an output current to be a constant value in accordance with an inductor current detection signal. Because there is no need for a compensation signal from the output current, the control circuit doesn't need a compensation capacitor for achieving constant current control, thereby decreasing the size of the power converter and the number of the pins of the control chip of the power converter.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF EMBODIMENTS OF THE INVENTION

Figure 1:
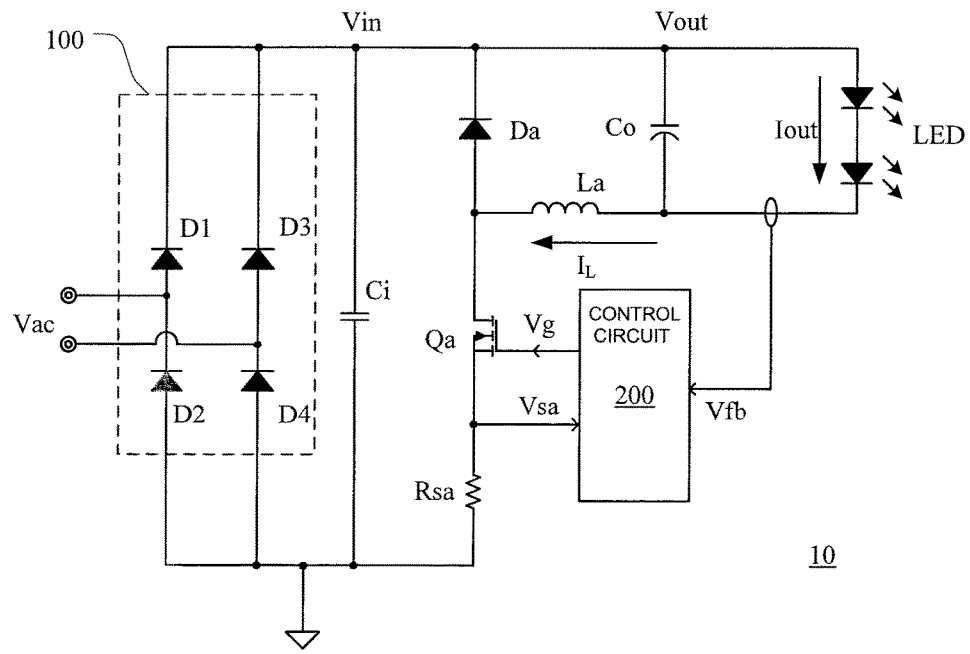
FIG. 1 is a schematic diagram of an example power converter according to the prior art.

Exemplary embodiments of the present disclosure will be described in more details below with reference to the accompanying drawings. The same elements are denoted by the same or similar reference numerals. The figures are not drawn to scale, for the sake of clarity.

FIG. 1 is a schematic diagram of an example power converter according to the prior art. In the embodiment shown in FIG. 1, the power converter 10 includes a rectifier bridge 100 composed of diodes D1 to D4, an input capacitor Ci, an output capacitor Co, a power switch Qa, a diode Da, an inductor La, a sampling resistor Rsa and a control circuit 200.

At the input terminal of the power converter 10, the input capacitor Ci is connected in parallel to the two output terminals of the rectifier bridge 100. After an external AC voltage is rectified by the rectifier bridge 100 and filtered by the input capacitor Ci, a sinusoidal half-wave DC input voltage Vin is generated across the input capacitor Ci.

The power switch Qa, the diode Da, the inductor La, and the output capacitor Co in the power converter 10 form a BUCK-type topology to provide a constant output current Iout across the output capacitor Co.

A sampling resistor Rsa and the power switch Qa are connected in series in the power converter 10. When the power switch Qa is on, the sampling resistor Rsa provides a current detection signal Vsa. During the operational period of the power converter, the power switch Qa is turned on and off alternately, the current IL flowing through the inductor La is filtered by the output capacitor Co for obtaining the output current Iout which flows through the load.

Moreover, the power converter 10 obtains a feedback signal Vfb of the output current by use of a sampling circuit. In an instance, the sampling circuit includes a current mirror or an additional sampling resistor connected in series with the load.

The control circuit 200 receives the current detection signal Vsa and the current feedback signal Vfb, and generates a switch control signal Vg in accordance with the two signals for switching the power switch Qa. The output current Iout is controlled to be a predetermined value in accordance with the current feedback signal Vfb, so that obtaining a constant output current.

Figure 2:
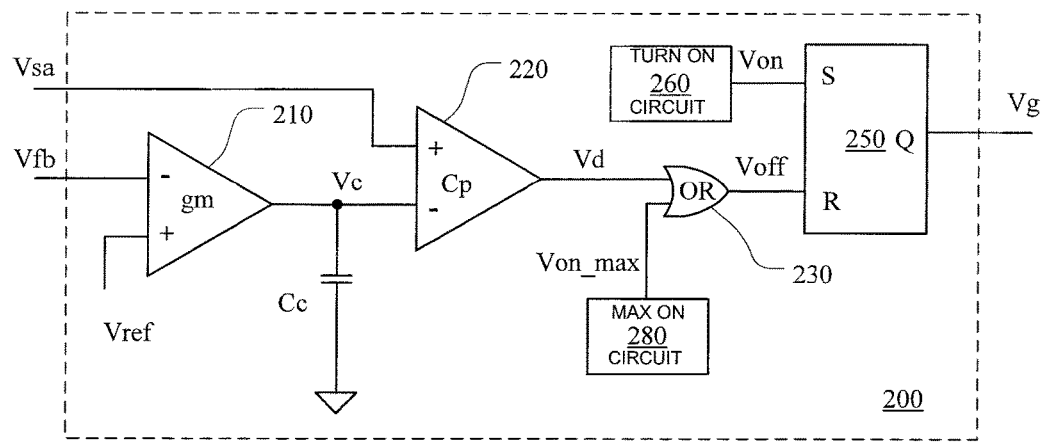
FIG. 2 is a schematic diagram of a control circuit of an example power converter according to the prior art.

FIG. 2 is a schematic diagram of a control circuit of an example power converter according to the prior art. The control circuit 200 includes a transconductance amplifier 210, a comparator 220, an OR gate 230, an RS flip-flop 250, a compensation capacitor Cc, a turn-on control circuit 260, and a maximum on-time circuit 280.

The transconductance amplifier 210 receives the output reference current signal Vref and the current feedback signal Vfb at the non-inverting input terminal and inverting input terminal respectively, for calculating an error. The compensation capacitor Cc is connected between the output terminal of the transconductance amplifier 210 and the ground so as to obtain a stable compensation signal Vc across the compensation capacitance Cc. The compensation signal Vc represents the error between the actual output current and a reference current.

The comparator 220 receives the inductor current detection signal Vsa at the non-inverting input terminal and the compensation signal Vc at the inverting input terminal and provides a first control signal Vd at the output terminal.

The maximum on-time circuit 280 generates a maximum on-time signal Von_max. When the power switch Qa is turned on, the maximum on-time circuit 280 starts timing. When the constant maximum on time Ton_max is reached, the maximum on-time signal Von_max becomes valid.

The OR gate has two input terminals for respectively receiving the first control signal Vd and the maximum on-time signal Von_max, and an output terminal for providing a turn-off signal Voff. When either of the first control signal Vd and the maximum on-time signal Von_max is valid, the turn-off signal Voff is valid.

The turn-on control circuit 260 is used for generating a turn-on signal Von. In an instance, the turn-on control circuit 260 is a clock signal generation circuit for generating a clock signal CLK. The cycle of the clock signal CLK is equal to the switching cycle of the power switch Qa.

The flip-flop RS 250 has a set terminal for receiving the turn-on signal Von and a reset terminal for receiving the turn-off signal Voff, and an output terminal for providing a switch control signal Vg.

In each switching cycle, the turn-on signal Von triggers the power switch Qa to be turned on, the turn-off signal Voff triggers the power switch Qa to be turned off.

In the above control circuit of the prior art, the compensation capacitance Cc is required to be introduced for obtaining a stable compensation signal because the ripple of the output current is large and the fluctuation of the feedback signal is correspondingly large. The compensation capacitor Cc can only be used as a peripheral component outside the chip and the chip must reserve the relative pins for the compensation capacitor.

Figure 3:
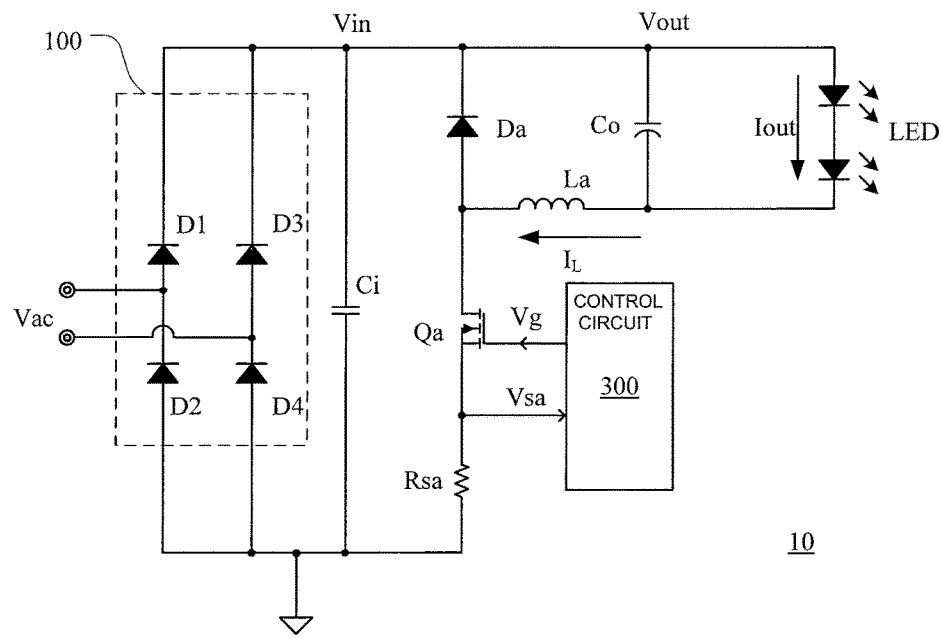
FIG. 3 is a schematic diagram of an example power converter according to an embodiment of the disclosure.

FIG. 3 is a schematic diagram of an example power converter according to an embodiment of the disclosure. In the embodiment shown in FIG. 3, the power converter 10 includes a rectifier bridge 100 composed of diodes D1 to D4, an input capacitor Ci, an output capacitor Co, a power switch Qa, a diode Da, an inductor La, a sampling resistor Rsa and a control circuit 300.

The power switch Qa, the diode Da, the inductor La, and the output capacitor Co in the power converter 10 form a BUCK-type topology to provide a constant output current Iout across the output capacitor Co. However, the disclosure is not limited to BUCK-type topology, but may be applied to any of the suitable topologies including but not limited to BUCK, BOOST, BUCK-BOOST, and FLYBACK topologies. As will be described below, the power converter operates in a critical conduction mode (BCM) under control of a peak current.

A sampling resistor Rsa and the power switch Qa are connected in series in the power converter 10. When the power switch Qa is on, a current IL flows through the inductor La, and the sampling resistor Rsa provides the inductor current detection signal Vsa. During the operational period of the power converter, an output current Iout flows through a load.

The power converter according to the embodiment of the present disclosure is different from the power converter shown in FIG. 1. The difference is that the control circuit 300 generates a switch control signal Vg in accordance with the inductor current detection signal Vsa for turning on and off the power switch Qa. The power converter operates in critical conduction mode under control of a peak current and adjusts or maintains an output current Iout to be a constant value only according to the inductor current detection signal Vsa. Therefore, the control circuit 300 achieves constant current control without a compensation capacitor, so that the size of the power converter 10 can be reduced, and the pin number of the control chip in the power converter can be decreased.

Figure 4:
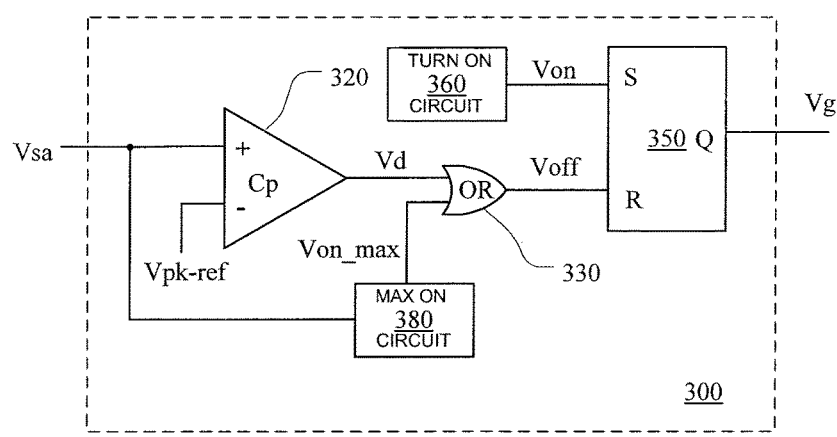
FIG. 4 is a schematic diagram of a control circuit of an example power converter according to an embodiment of the disclosure.

FIG. 4 is a schematic diagram of a control circuit of an example power converter according to an embodiment of the disclosure. The control circuit 300 includes a comparator 320, an OR gate 330, an RS flip-flop 350, a turn-on control circuit 360, and a maximum on-time circuit 380.

The comparator 320 receives the inductor current detection signal Vsa at the non-inverting input terminal and an inductor current peak reference signal Vpk-ref at the inverting input terminal, and provides the first control signal Vd at the output terminal.

The maximum on-time circuit 380 generates a maximum on-time signal Von_max in accordance with the inductor current detection signal Vsa. When the power switch Qa is turned on, the maximum on-time circuit 380 starts timing. When the maximum on time Ton_max is reached, the maximum on-time signal Von_max becomes valid.

The OR gate 330 has two input terminals for respectively receiving a first control signal Vd and a maximum on-time signal Von_max, and an output terminal for providing a turn-off signal Voff. As long as either of the first control signal Vd and the maximum on-time signal Von_max is valid, the turn-off signal Voff is valid.

The turn-on control circuit 360 is used for generating a turn-on signal Von.

The RS flip-flop 360 has a set terminal for receiving the turn-on signal Von and a reset terminal for receiving the turn-off signal Voff, and an output terminal for providing a switch control signal Vg.

In each switching cycle, the turn-on signal Von triggers the power switch Qa to be turned on, the turn-off signal Voff triggers the power switch Qa to be turned off.

The turn-on control circuit 360 has different structures in different operation modes and in different topological types. For example, in a BUCK-type circuit which operates in the CCM operation mode, the switch is turned on when the inductor current crosses zero, because the inductor current flows through the load during the entire switching cycle. Therefore, the turn-on control circuit 360 may be a zero-crossing detection circuit for an inductor current.

During the timer period in which the power switch Qa is off, the turn-on signal Von of the turn-on control circuit 360 is valid when the inductor current IL is detected to cross zero. Correspondingly, the switch control signal Vg controls the power switch Qa to be turned on, thereby starting a switching cycle.

Subsequently, the inductor current IL starts to rise, and the comparator 220 generates the turn-off signal Voff in accordance with the inductor current detection signal Vsa and the predetermined inductor current peak signal Vpk-ref. Correspondingly, the switch control signal Vg controls the power switch Qa to be turned off.

Subsequently, the inductor current IL starts to decrease. The turn-on signal Von of the turn-on control circuit 360 is valid when the inductor current decreases to cross zero. Correspondingly, the switch control signal Vg controls the power switch Qa to be turned on again, so that the current switching cycle is ended and a next switching cycle starts.

In each switching cycle, the on time of the power switch Qa is controlled in accordance with the inductor current detection signal Vsa. However, unlike the conventional control circuit shown in FIG. 2, the maximum on time Ton_max of the maximum on-time circuit 380 according to the embodiment is not constant but varies in dependence on the inductor current detection signal Vsa. The control circuit 300 obtains an adjustable maximum on time Ton_max in accordance with the current detection signal Vsa so as to control the output current Iout to be a predetermined value, so that a constant output current is obtained.

Compared with the conventional control circuit shown in FIG. 2, the control circuit 300 can achieve constant current control without the feedback signal Vfb of the output current, so that the sampling circuit of the output current and the corresponding signal processing circuit are omitted. For example, the control circuit 300 doesn't need for the transconductance amplifier 210 and the compensation capacitor Cc shown in FIG. 2, so that the peripheral components and chip pins can be reduced.

Figure 5:
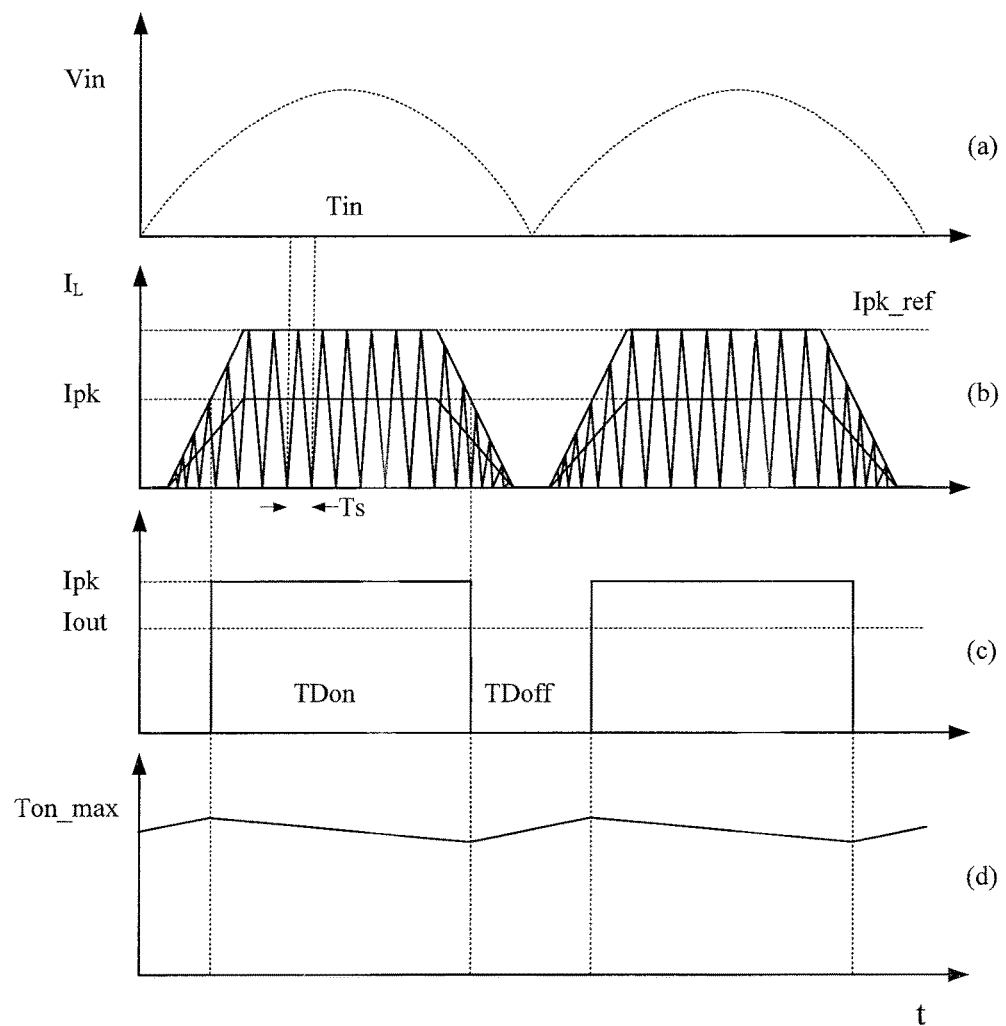
FIG. 5 is a waveform diagram of an example power converter according to an embodiment of the disclosure.

FIG. 5 is a waveform diagram of an example power converter according to an embodiment of the disclosure. In the following description, the power converter having a BUCK-type topology is still illustrated as an example. The power converter operates in a peak conduction mode (BCM) under control of a peak current, where an inductor current peak reference signal is Ipk_ref.

During operation of the power converter, the input voltage Vin is a half-wave DC voltage signal as shown in FIG. 5(a). In a half cycle Tin of a power frequency signal, the amplitude of the input voltage Vin varies approximately sinusoidal.

During a half cycle Tin of a power frequency signal, the power switch experiences a plurality of switching cycles Ts. In each switching cycle, the first control signal Vd is valid when the inductor current detection signal Vsa is greater than the inductor current peak reference signal Vpk-ref. When either of the first control signal Vd and the maximum on-time signal Von_max is valid, the turn-off signal Vg turns off the power switch.

The amplitude of the input voltage Vin is small, the changing rate of the inductor current is small and the peak value of the inductor current is limited by the maximum on time Ton_max at the beginning and ending of the half cycle Tin of the power frequency signal. The amplitude of the input voltage Vin is large, the changing rate of the inductor current is large and the peak value of the inductor current is limited by the inductor current peak reference signal Ipk_ref at an intermediate time period of the half cycle Tin of the power frequency signal. Therefore, the peak envelope of the inductor current IL appears approximately in a first trapezoid during the half cycle Tin of the power frequency signal, as shown in FIG. 5(b).

The inductor current IL is filtered by the output capacitor Co, and then forms an output current Iout. The capacitance value of output capacitor is generally very large, the output current Iout in each switching cycle is an average value of the inductor current in the switching cycle. The output current Iout in each switching cycle Ts is half of the peak value of the inductor current IL, since the circuit operates in the BCM mode under control of a peak current. The output current Iout may be approximated to a second trapezoid during the half cycle Tin of the power frequency signal, as shown in FIG. 5(b).

The second trapezoid has a lower edge with same length as that of the first trapezoid, and an upper edge with same length as that of the first trapezoid, but the height of the second trapezoid is half of that of the first trapezoid, during the half cycle Tin of the power frequency signal. The height of the first trapezoid is the predetermined inductor current peak reference signal Ipk_ref and the height of the second trapezoid is Ipk, so Ipk=1/2*Ipk_ref. An area of the second trapezoid in the half cycle Tin of the power frequency signal determines a value of the output current Iout during the half cycle Tin of the power frequency signal. The second trapezoid may be equivalent to a rectangle having a height Ipk and an area which is equal to the area of the second trapezoid.

Therefore, the output current Iout can be equivalent to a rectangular wave with an amplitude Ipk and a duty ratio D, as shown in FIG. 5(c). The output current Iout=Ipk*D, Ipk is fixed to be 1/2*Ipk_ref, so that the value of the output current can be adjusted by adjusting the duty ratio D of the rectangular wave.

In one instance, the duration time TDon of a high level of the output current Ipk is obtained by sampling the peak value of the inductor current. In another instance, since the peak envelope of the sampled inductor current IL in the half cycle Tin of a power frequency signal is an isosceles trapezoid, it is possible to measure the time period in which the inductor current peak rises from 1/2*Ipk_ref and then again falls to 1/2*Ipk_ref, to obtain a duration time TDon of a high level of output current Ipk. Additionally, since the changing cycle of the output current is the same as the half cycle Tin of the input voltage Vin, the equivalent duty ratio D is calculated in accordance with the duration time TDon of a high level and the half cycle Tin after the duration time TDon of a high level is obtained.

In the BCM mode under control of a peak current, the inductor current peak reference signal Ipk_ref of the inductor current is a predetermined constant value, so that the peak value Ipk of the output current is also a fixedly constant value. Therefore, according to the relationship between the output current wave and an average current, Iout=Ipk*D, the average value of the output current Iout is controlled to be constant as long as the equivalent duty ratio D of the output current Iout is always a constant value Dref in each half cycle. When the equivalent duty ratio D is less than Dref, it is indicated that the duration time of the output current Iout at the Ipk state is too short, the maximum on time should be increased for increasing the duration time of the output current Iout at the Ipk state, i.e., the equivalent duty ratio D should be increased. On the contrary, the maximum on time Ton_max should be decreased for decreasing the duration time of the output current at the Ipk state, i.e., the equivalent duty ratio D should be decreased. During the half cycle Tin of the power frequency signal, the maximum on time Ton_max has three linear phases, as shown in FIG. 5(d).

Obviously, when the power converter according to the disclosure operates in peak current mode, the average value of the output current Iout can be approximately equivalent to Iout=Ipk*D, D is an equivalent duty ratio when the output current operates at the Ipk state in the half cycle Tin of the power frequency signal. Ipk is a constant value at different input voltages Vin. The disclosure controls the equivalent duty ratio D to be a constant value Dref to have a closed loop of the output current Iout, adjusts the line regulation and realizes the performance of the high power factor. The line regulation represents variation of the output voltage when the input voltage varies in an operational range for a rated load. The power converter can not only omit the external large capacitor and reduce pins of the chip, but also simplifies the sampling circuit and closed-loop control circuit.

Figure 6:
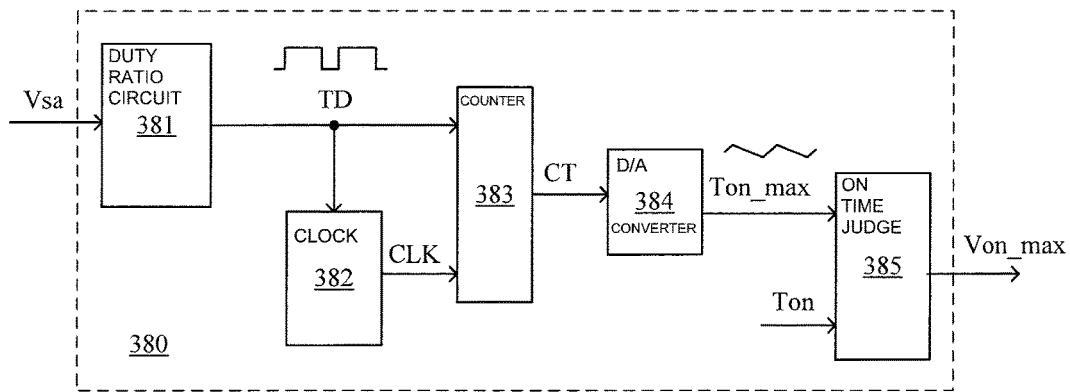
FIG. 6 is a schematic diagram showing an example maximum on-time circuit of the power converter in FIG. 4.

FIG. 6 is a schematic diagram showing an example maximum on-time circuit of the power converter in FIG. 4. The maximum on-time circuit 380 includes an equivalent duty ratio circuit 381, a clock signal generation circuit 382, a counter circuit 383, a digital-to-analog conversion circuit 384, and an on-time judgment circuit 385.

The equivalent duty ratio circuit 381 generates a signal TD in accordance with a current detection signal Sa. The signal Td is a rectangular wave with the equivalent duty ratio D, as shown in FIG. 5(c). In the half cycle Tin of the power frequency signal, the equivalent duty ratio D is either a ratio of the time period in which the peak value of the inductor current rises above 1/2*Ipk-ref and then falls below 1/2*Ipk-ref again to the half cycle Tin of the power frequency signal, or a ratio of time period in which the inductor current varies from Ipk-ref to zero to the half cycle Tin of the power frequency signal.

The clock signal generation circuit 382 generates a clock signal CLK in accordance with TD. The clock signal CLK has a first frequency f1 during the time period in which TD is at a high level, and a second frequency f2 during the time period in which TD is at a low level.

The counter circuit 383 counts upward and downward in accordance with the signal TD and the clock signal CLK, thereby obtaining the counter value CT. The counter circuit 383 has a predetermined value. The counter circuit 383 counts downward while TD is at a high level, and upward while TD is at a low level.

The digital-analog conversion circuit 384 converts the counter value CT to a maximum on time Ton_max. Since the counter circuit 383 always counts upward and downward, the maximum on time Ton_max is always dynamically changed in each half cycle Tin of the power frequency signal, as shown in FIG. 5(d).

The on-time judgment circuit 385 compares the maximum on-time Ton_max with an actual on time Ton of the power switch. Once the actual on time Ton is found to be equal to the maximum on time Ton_max, that is, a valid maximum on-time signal Von_max is output, the power switch is turned off.

Thus, f1×D=(1−D)×f2, the equivalent duty ratio D=f2/(f1+f2). In the present embodiment, the reference duty ratio Dref=f2/(f1+f2). The value of the reference duty Dref can be varied by changing the first frequency f1 and/or the second frequency f2 of the clock signal.

If the equivalent duty ratio D is greater than the reference duty ratio Dref, the counter circuit increases the time of counting downward and decreases the time of counting upward in a half cycle. The counter value CT of the half cycle is less than the predetermined value, which indicates that the output current Iout is high. If the equivalent duty ratio D is less than the reference duty ratio Dref, the counter circuit decreases the time of counting downward and increases the time of counting upward in a half cycle. The counter value CT of the half cycle is greater than the predetermined value, which indicates that the output current Iout is low.

During operation of the power converter, the counter value CT at the end of the previous half cycle is used as an initial value at the beginning of the next half cycle. Because the initial value of the counter value in each half cycle varies with respect to the predetermined value, the initial value of the maximum on time in each half cycle is no longer constant, but dynamically adjusted in accordance with the counter value at the end of the previous half cycle, that is, it is dynamically adjusted in accordance with the equivalent duty ratio in the previous half cycle. If the equivalent duty ratio is detected to be greater than the reference duty ratio in the previous half cycle, the initial value of the maximum on time Ton_max will decrease in the next half cycle. If the equivalent duty ratio is detected to be less than the reference duty ratio in the previous half cycle, the initial value of the maximum on time Ton_max will increase in the next half cycle.

The maximum on-time circuit 380 actually provides a negative feedback loop of the maximum on time Ton_max with respect to the equivalent duty ratio D so that the maximum on time Ton_max is dynamically adjusted to maintain the equivalent duty ratio D approximately equal to the reference duty ratio Dref. Thus, closed loop control of the output current Iout is achieved to maintain the output current Iout to be constant.

In this embodiment, the maximum on-time circuit 380 adjusts the value of the maximum on time Ton_max by counter values of the counter circuit 383 at the clock signals with different frequency. As described above, the maximum on time Ton_max is always dynamically changed in each half cycle Tin of the power frequency signal, as shown in FIG. 5(d).

In an alternative embodiment, the maximum on-time circuit may include two independent counter circuits, which obtain duration time TDon of a high level and duration time TDoff of a low level, respectively. The equivalent duty ratio is calculated at the end of the previous half cycle, and the maximum on time Ton_max of the next half cycle is adjusted in accordance with the equivalent duty ratio of the previous half cycle. The maximum on-time circuit actually provides a negative feedback loop of the maximum on time Ton_max with respect to the equivalent duty ratio D so that the maximum on time Ton_max is dynamically adjusted to maintain the equivalent duty ratio D approximately equal to the reference duty ratio Dref. Thus, closed loop control of the output current Iout is achieved to maintain the output current Iout to be constant. In this alternative embodiment, the maximum on time Ton_max may be unchanged in each half cycle Tin of the power frequency signal.

Figures 7, 8:
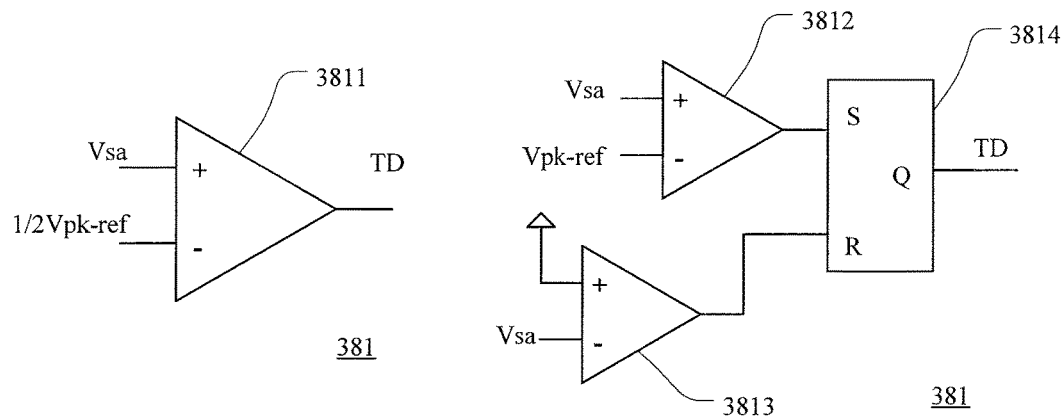
FIG. 7 is a schematic diagram showing an example equivalent duty ratio circuit of the maximum on-time circuit of the power converter in FIG. 6.
FIG. 8 is a schematic diagram showing another equivalent duty ratio circuit of the maximum on-time circuit of the power converter in FIG. 6.

FIG. 7 is a schematic diagram showing an example equivalent duty ratio circuit of the maximum on-time circuit of the power converter in FIG. 6. In this instance, the equivalent duty ratio circuit 381 includes a comparator 3811. The comparator 3811 receives a current detection signal Sa at the non-inverting input terminal and a current peak reference signal 1/2*Ipk_ref at the inverting input terminal, and provides the signal TD at the output terminal.

When the current detection signal Sa is greater than 1/2*Ipk_Ref, the signal TD is at a high level, otherwise it is at a low level. The signal Td has a waveform the same with the rectangular wave of the equivalent duty ratio D, as shown in FIG. 5(c). In the half cycle Tin of the power frequency signal, the equivalent duty ratio D is a ratio of the time period in which the peak value of the inductor current varies from a first value 1/2*Ipk_ref to a second value 1/2*Ipk_ref to the half cycle Tin of the power frequency signal.

FIG. 8 is a schematic diagram showing another equivalent duty ratio circuit of the maximum on-time circuit of the power converter in FIG. 6. In this instance, the equivalent duty ratio circuit 381 includes a first comparator 3812, a second comparator 3813, and an RS flip-flop 3814. The first comparator 3812 receives a current detection signal Sa at the non-inverting input terminal and a current peak reference signal Ipk_ref at the inverting input terminal, and the output of the comparator 3812 is coupled to a set terminal of the RS flip-flop 3814. The non-inverting input terminal of the second comparator 3813 is coupled to the ground, the inverting input terminal receives the current detection signals Sa, and the output terminal is coupled to the reset terminal of the RS flip-flop 3814. The output terminal of RS flip-flop 3814 provides the signal TD.

When the current detection signal Sa is greater than Ipk_ref, the first comparator 3812 generates a high-level signal so that the RS flip-flop 3814 changes form a low level to a high level. When the current detection signal Sa is zero, the second comparator 3813 generates a high-level signal so that the RS flip-flop 3814 changes form a high level to a low level. The signal Td is a rectangular wave with the equivalent duty ratio D, as shown in FIG. 5(c). In the half cycle Tin of the power frequency signal, the equivalent duty ratio D is a ratio of the time period in which the peak value of the inductor current rises to Ipk-ref and then falls to zero, to the half cycle Tin of the power frequency signal.

Figure 9:
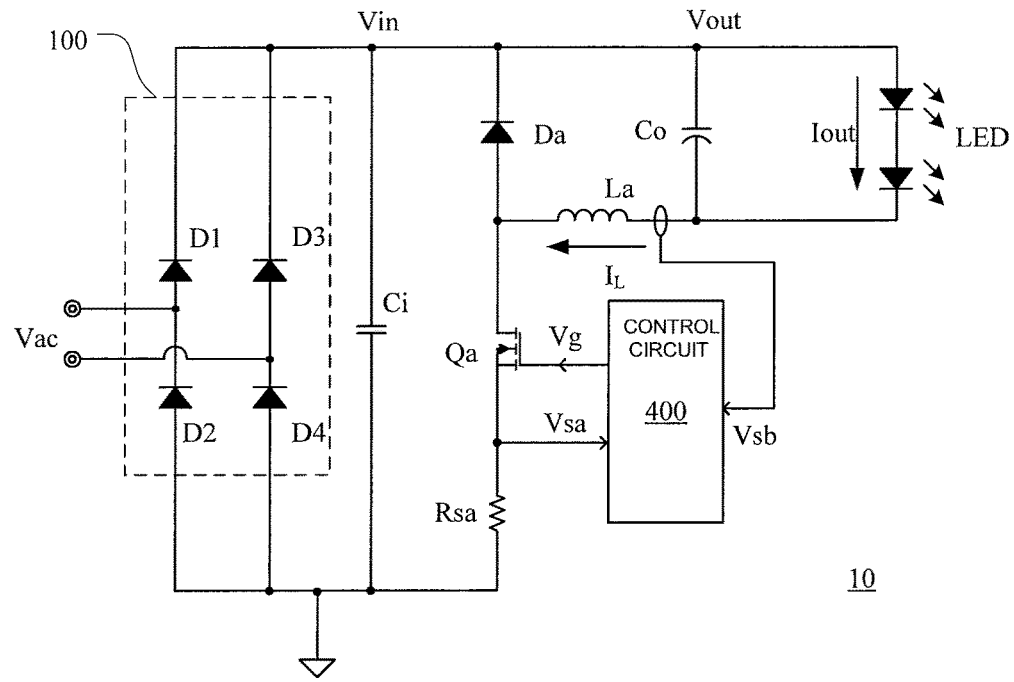
FIG. 9 is a schematic diagram of an example power converter according to an embodiment of the disclosure.

FIG. 9 is a schematic diagram of an example power converter according to an embodiment of the disclosure. In an embodiment shown in FIG. 9, the power converter 10 includes a rectifier bridge 100 composed of a diode D1 to a diode D4, a input capacitor Ci, an output capacitor Co, a power switch Qa, a diode Da, an inductor La, a sampling resistor Rsa and a control circuit 400.

The power switch Qa, the diode Da, the inductor La, and the output capacitor Co in the power converter 10 form a BUCK-type topology to provide a constant output current Iout across the output capacitor Co. However, the disclosure is not limited to BUCK-type topology, but may be applied to any of suitable topologies including but not limited to BUCK, BOOST, BUCK-BOOST, FLYBACK topologies. As will be described below, the power converter operates in a discontinuous conduction mode (DCM) under control of a peak current.

A sampling resistor Rsa is coupled in series with the power switch Qa in the power converter 10. The sampling resistor Rsa provides a current detection signal Vsa during the time period in which the power switch Qa is on. During operation of the power converter, the power switch Qa is turned on and off alternately, the current IL flows through the inductor La, and filtered by the capacitor Co to provide an output current Iout through a load. A current detection signal Vsb is obtained by a sampling circuit. In an instance, the sampling circuit includes an additional sampling resistor or current mirror being coupled in series with the inductor.

The power converter according to the embodiment of the present disclosure is different from the power converter shown in FIG. 1. The difference is that the control circuit 400 generates a switch control signal Vg in accordance with the current detection signals Vsa and Vsb for turning on and off the power switch Qa, further the output current is controlled to be equal to a predetermined value, so that constant current control is achieved. The power converter operates in a discontinuous conduction mode (DCM) under control of a peak current and the value of the output current Iout can be estimated in accordance with the current detection signals Vsa and Vsb. Accordingly, the control circuit 400 can achieve constant current control without the feedback signal Vfb of the output current, so that the sampling circuit of the output current and the corresponding signal processing circuit are omitted.

Figure 10:
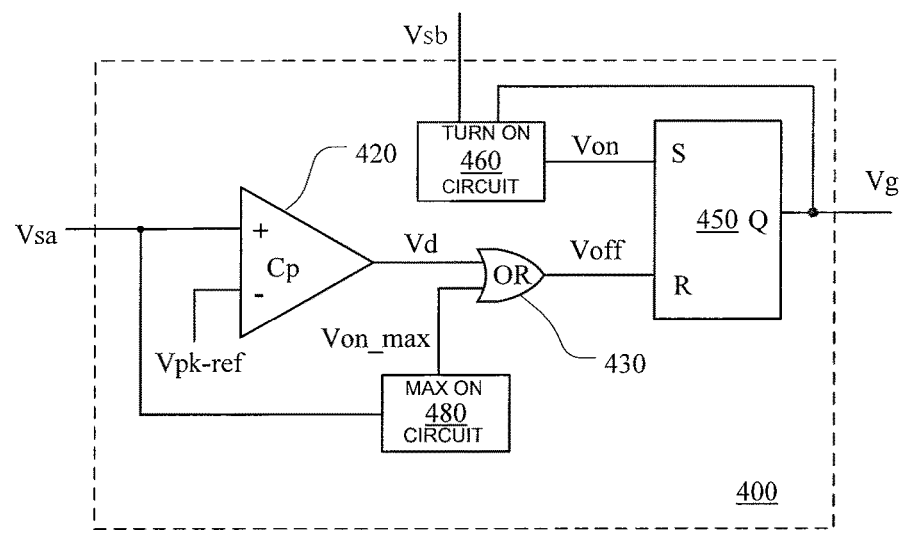
FIG. 10 is a schematic diagram of a control circuit of an example power converter according to an embodiment of the disclosure.

FIG. 10 is a schematic diagram of a control circuit of an example power converter according to an embodiment of the disclosure. The control circuit 400 includes a comparator 420, an OR gate 430, an RS flip-flop 450, a turn-on control circuit 460, and a maximum on-time circuit 480.

The comparator 420 receives the current detection signal Vsa at the non-inverting input terminal and current peak reference signal Vpk-ref at the inverting input terminal, and provides the first control signal Vd at the output terminal.

The maximum on-time circuit 480 generates a maximum on-time signal Von_max in accordance with the current detection signal Vsa. When the power switch Qa is turned on, the maximum on-time circuit 480 starts to count and when the maximum on time Ton_max, which is adjustable, is reached, the maximum on-time signal Von_max is valid. When either of the first control signal Vd and the maximum on-time signal Von_max is valid, the turn-off signal Voff provided at the output terminal of the OR gate 230 is valid.

The maximum on-time circuit 480 in this embodiment is the same as the maximum on-time circuit 380 shown in FIGS. 6 to 8 and will not be described again hereafter.

The flip-flop RS 460 has a set terminal for receiving the turn-on signal Von and a reset terminal for receiving the turn-off signal Voff, and an output terminal for providing a switch control signal Vg. In each switching cycle, the turn-on signal Von triggers the power switch Qa to be turned on, the turn-off signal Voff triggers the power switch Qa to be turned off.

The turn-on control circuit 460 generates the turn-on signal Von in accordance with the current detection signal Vsb and the switch control signal Vg. The turn-on control circuit 460 has a different structure in different operating modes and in different topological types.

In the BUCK-type circuit in the DCM operation mode, since the inductor current flows through the load only in a time period during the switching cycle, the ratio Txy/Ts of the time period Txy in which the inductor current flows through the load to the switching period Ts is set to a constant value.

As will be described below, the turn-on control circuit 460 may include a zero-crossing detection circuit for an inductor current and a constant ratio circuit. The ratio Txy/Ts is driven to reach a fixed value when a delay time has elapsed after the inductor current is detected to cross zero, and then the turn-on signal Von generated by the turn-on control circuit 460 is valid, the switch control signal Vg controls the power switch Qa to be turned on. Subsequently, the inductor current starts to rise, and the comparator 220 generates the turn-off signal Voff in accordance with the sampling signal Vsa of the inductor current IL and the predetermined inductor current peak signal Vpk-ref. When Vsa is greater than Vpk-ref, Vd is valid, and the switch control signal Vg output by the RS flip-flop 460 controls the power switch to be turned off when either Vd or the maximum on-time signal Von_max of the maximum on-time circuit is valid. The ratio of the time period in which the peak value of the output current is equal to the product of the reference peak value and 1/2*Txy/Ts to the half cycle Tin of the power frequency signal is controlled to be equal to the equivalent duty ratio D in the half cycle Tin. The maximum on-time circuit 480 compares the equivalent duty ratio D with a predetermined reference duty ratio signal in accordance with the equivalent duty ratio D. When the equivalent duty ratio is greater than the predetermined reference duty ratio, the maximum on time is decreased. When the equivalent duty ratio is greater than the reference duty ratio, the maximum on time is increased. The on time of the power switch is compared with the maximum on time. The maximum on-time signal Von_max is valid when the on time of the power switch is equal to the maximum on time.

The control circuit 400 generates the switch control signal Vg for turning on and off the power switch Qa in accordance with the current detection signal Vsa, the current detection signal Vsb and switch control signal Vg.

The control circuit 400 obtains the maximum on time Ton_max, which is adjustable, in accordance with the current detection signal Vsa so as to control the output current Iout to be a predetermined value, so that a constant output current is obtained. The control circuit achieves constant current control without the feedback signal Vfb of the output current, so that the sampling circuit of the output current and the corresponding signal processing circuit are omitted. Comparing with that in FIG. 2, the control circuit omits the transconductance amplifier 210 and the compensation capacitor Cc, so that the peripheral components and chip pins can be reduced.

Figure 11:
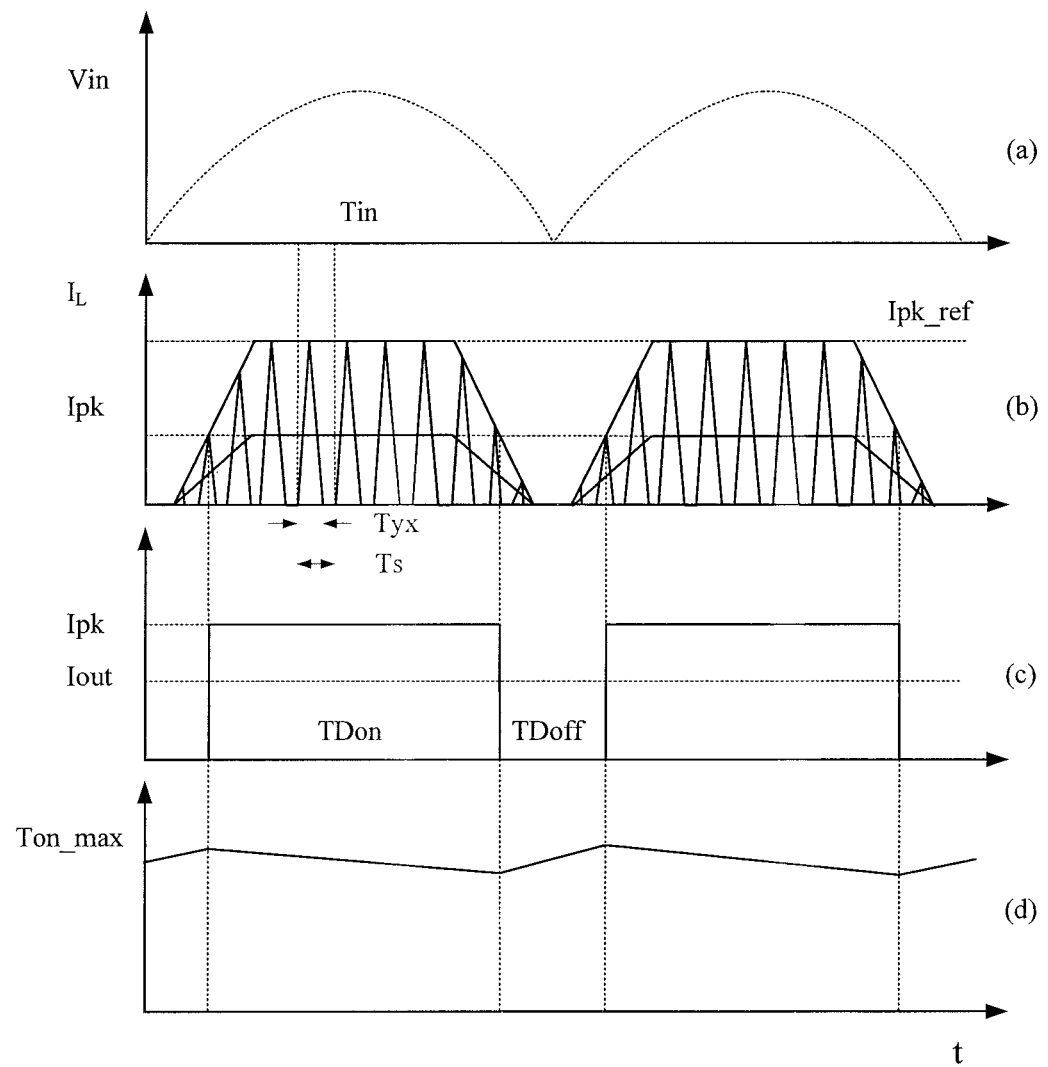
FIG. 11 is a waveform diagram of an example power converter according to an embodiment of the disclosure.

FIG. 11 is a waveform diagram of an example power converter according to an embodiment of the disclosure. The power converter with a BUCK topology will still be illustrated as an example as follows. The power converter operates in a discontinuous conduction mode(DCM) under control of a peak current, where an inductor current peak reference signal of the inductor current is Ipk_ref.

During operation of the power converter, the input voltage Vin is a half-wave DC voltage signal as shown in FIG. 11(*a*). The amplitude of the input voltage Vin in the half cycle Tin of the power frequency signal varies approximately sinusoidally, that is, it gradually increases and then gradually decreases.

When the input voltage Vin is low, the peak value of the inductor current is limited by the maximum on time Ton_max. When the input voltage Vin is large, the peak value of the inductor current is limited by the inductor current peak reference signal Ipk_ref. Therefore, the peak envelope of the inductor current appears approximately in a trapezoid during the half cycle Tin of the power frequency signal, as shown in FIG. 11(*b*).

The power converter experiences a plurality of switching cycles Ts in the half cycle Tin of the power frequency signal, i.e. the input voltage Vin. Because the power converter operates in a DCM mode under control of a peak current, the inductor current flows through the load only in a time period Tyx during each switching cycle Ts. The rated value, i.e, the peak value, of the output current Iout is the product of the inductor current IL and 1/2*Txy/Ts in each switching cycle Ts. The output current Iout is approximately a trapezoid wave in the half cycle Tin of the power frequency signal, and the height of the trapezoid is the peak value Ipk of the output current, where Ipk=1/2*Txy/Ts*Ipk_ref. As shown in FIG. 11(*c*), since the area of the trapezoid determines the average value of the output current Iout, the waveform of the output current Iout is equivalent to a rectangle wave with a peak value Ipk and a duty ratio D, i.e., an average value Iout of the output current Iout=Ipk*D, in the DCM mode under control of a peak current.

As can be seen from FIG. 11(*b*), the duty ratio D of the output current Iout is the equivalent duty ratio of the output current at the Ipk state. In one instance, the duration time TDon of a high level in which the output current is Ipk is obtained by sampling the peak value of the inductor current. In another instance, since the peak envelope of the sampled inductor current IL in the half cycle Tin of the power frequency signal is an isosceles trapezoid, it is possible to measure the time period in which the inductor current peak rises from 1/2*Txy/Ts*2 Ipk_ref and then again falls to 1/2*Txy/Ts*2 Ipk_ref, to obtain the duration time TDon of a high level in which the output current is Ipk. Additionally, since the changing cycle of the output current is the same as the half cycle Tin of the power frequency signal, i.e. the input voltage Vin, the duration time TDoff of a low level is calculated in accordance with the half cycle Tin of the power frequency signal and the duration time TDon of a high level after the duration time TDon of a high level is obtained. Further, the equivalent duty ratio D can be calculated in accordance with the duration time TDon of a high level and the duration time TDoff of a low level.

In the BCM mode under control of a peak current, the inductor current peak reference signal Ipk_ref of the inductor current is a predetermined constant value, so that the peak value Ipk of the output current is also a fixedly constant value. Therefore, according to the relationship between the output current wave and an average current, Iout=Ipk*D, the average value of the output current Iout is controlled to be constant as long as the equivalent duty ratio D of the output current Iout is always equal to a constant value Dref in each half cycle. When the equivalent duty ratio D is less than Dref, it is indicated that the duration time of the output current Iout at the Ipk state is too short, the maximum on time should be increased for increasing the duration time of the output current Iout at the Ipk state, i.e., the equivalent duty ratio D should be increased. On the contrary, the maximum on time Ton_max should be decreased for decreasing the duration time of the output current at Ipk state, i.e., the equivalent duty ratio D should be decreased. During the half cycle Tin of the power frequency signal, the maximum on time Ton_max has three linear phases, as shown in FIG. 11(d).

Obviously, when the power converter according to the disclosure operates in peak current mode, the average value of the output current Iout can be approximately equivalent to Iout=Ipk*D, D is an equivalent duty ratio when the output current operates at the Ipk state in the half cycle Tin of the power frequency signal. Ipk is a constant value at different input voltages Vin. The embodiments of the disclosure controls the equivalent duty ratio D to be a constant value Dref to have a closed loop of the output current Iout, adjusts the line regulation and realizes the performance of the high power factor. For a rated load, the line regulation shows that the output voltage varies when the input voltage varies in an operational range. The power converter can not only omit the external large capacitor and reduce pins of the chip, but also simplifies the sampling circuit and closed-loop control circuit.

Figure 12:
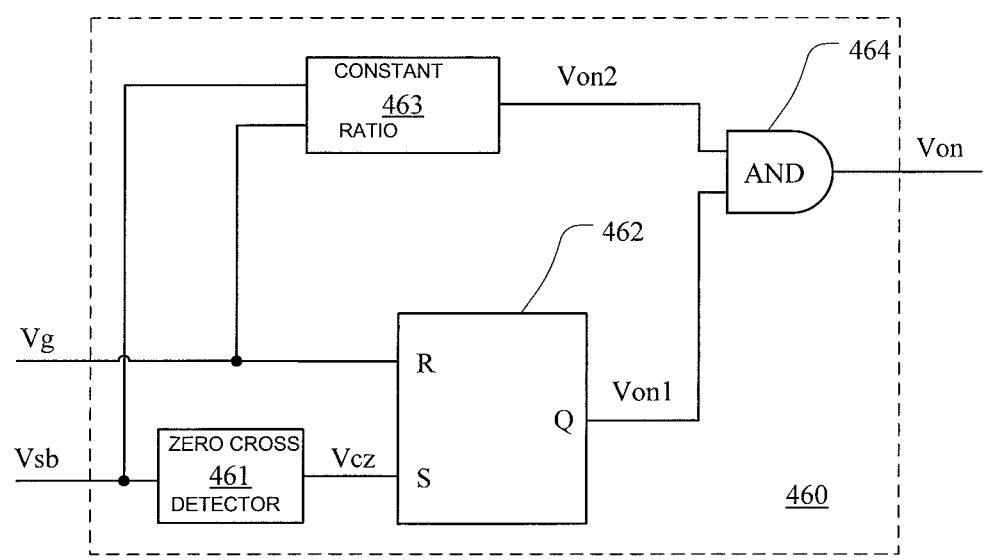
FIG. 12 is a schematic diagram showing a turn-on control circuit of the example power converter in FIG. 10.

FIG. 12 is a schematic diagram showing a turn-on control circuit of the example power converter in FIG. 10. The turn-on control circuit 460 includes a zero-crossing detection circuit 461, an RS flip-flop 462, a constant ratio circuit 463, and an AND gate 464.

The zero-crossing detection circuit 461 receives a current detection signal Vsb for representing the inductor current IL and provides a zero-crossing signal Vcz at the output terminal. When the inductor current IL falls to zero, the zero-crossing signal Vcz is valid.

The RS flip-flop 462 receives the zero-crossing signal Vcz at a set terminal and the switch control signal Vg at a reset terminal, respectively, and provides a first turn-on signal Von1 at the output terminal. In each switching cycle Ts, when the inductor current IL is detected to cross zero, the first turn-on signal Von1 is valid.

The zero-crossing detection circuit 461 and the RS flip-flop 462 ensure that the inductor current IL is zero when the power switch is turned on again at the end of the switching cycle Ts.

The constant ratio circuit 463 receives the current detection signal Vsb and switch control signal Vg at input terminals, respectively, and provides the second turn-on signal Von2 at an output terminal. The constant ratio circuit 463 maintains the ratio Txy/Ts of the time period Txy in which the inductor current flows through the load to the switch cycle Ts to be a constant value. In each switching cycle, the second turn-on signal Von2 is valid when a time period has elapsed after the inductor current is detected to cross zero and until the ratio Txy/Ts of the time period Txy in which the inductor current flows through the load to the switching cycle Ts reaches a constant value.

When the constant ratio circuit 463 ensures that the power switch is turned on again at the end of the switching cycle Ts, the ratio Txy/Ts of the time period Txy in which the inductor current flows through the load to the switching cycle Ts is a constant value.

The AND gate 464 receives the first turn-on signal Von1 and the second turn-on signal Von2 at two input terminals, respectively, and provides the turn-on signal Von at an output terminal. When both of the first turn-on signal Von1 and the second turn-on signal Von2 are valid, it indicates that one switching cycle has ended and the power switch can be turned on again.

The control circuits and control methods for a power converter according to the preferred embodiments of present disclosure have been described in detail. It is apparent for one skilled person that other technique or configuration or circuits or electronic devices, if being equivalents, can also be used in these embodiments.

Although various embodiments of the present disclosure are described above, these embodiments neither present all details, nor imply that the present disclosure is limited to these embodiments. Obviously, many modifications and changes may be made in light of the teaching of the above embodiments. These embodiments are presented and some details are described herein only for explaining the principle of the disclosure and its actual use, so that one skilled person can practice the present disclosure and introduce some modifications in light of the invention. The disclosure is intended to cover alternatives, modifications and equivalents that may be included within the spirit and scope of the disclosure as defined by the appended claims.

What is claimed is:

1. A control circuit for a power converter, wherein said power converter comprises a power switch and an inductor being coupled to said power switch, said control circuit controls operation of said power switch to charge and discharge said inductor for generating an inductor current and providing an output current, said control circuit controls said power switch to be turned on when or after an inductor current detection signal is zero, and controls said power switch to be turned off when said inductor current detection signal reaches a peak reference signal or when said power switch has been turned on for a maximum on time, wherein said control circuit adjusts said maximum on time in accordance with said inductor current detection signal so that said power converter provides a constant output current to a load.

2. The control circuit according to claim 1, wherein an input voltage of said power converter is a DC input voltage with an amplitude varying in a first cycle, said output current is equivalent to a DC output current which has an equivalent duty ratio and varies in said first cycle, said control circuit adjusts said maximum on time in accordance with said inductor current detection signal, so that said equivalent duty ratio is controlled to be approximately equal to a reference duty ratio.

3. The control circuit according to claim 2, wherein said control circuit comprises:
    a turn-on control circuit for generating a turn-on signal for turning on said power switch;
    a comparator for comparing said inductor current detection signal with said peak current reference signal to provide a first control signal;
    a maximum on-time circuit for generating a maximum on-time signal in accordance with said inductor current detection signal;
    an OR gate having two input terminal for respectively receiving said first control signal and said maximum on-time signal, and an output terminal for providing an turn-off signal for turning off said power switch; and
    an RS flip-flop having a set terminal for receiving said turn-on signal and a reset terminal for receiving said turn-off signal respectively, and an output terminal for providing a switch control signal for controlling said power switch.

4. The control circuit according to claim 3, wherein said turn-on control circuit is a zero-crossing detection circuit, which generates said turn-on signal when a zero crossing point of said inductor current detection signal is detected.

5. The control circuit according to claim 3, wherein said switch control signal has a second cycle which is less than said first cycle,
said turn-on control circuit generates said turn-on signal when a predetermined time period has elapsed after said zero crossing point of said inductor current detection signal was detected, and maintains a constant ratio of said time period during which said inductor current flows through said load to said second cycle.

6. The control circuit according to claim 5, wherein said turn-on control circuit comprises:
a zero-crossing detection circuit for generating a first turn-on signal when said zero crossing point of said inductor current detection signal is detected;
a constant ratio circuit for obtaining said time period during which said inductor current flows through said load in accordance with said inductor current detection signal, obtaining said second cycle in accordance with said switch control signal, and generating a second turn-on signal when said ratio of said time period during which said inductor current flows through said load to said second cycle is a constant value; and
an AND gate having two input terminals for respectively receiving said first turn-on signal and said second turn-on signal, and an output terminal for providing said turn-on signal of said power switch.

7. The control circuit according to claim 2, wherein said maximum on-time circuit comprises:
a counter circuit which begins to decrement a counter value when said inductor current detection signal increases to a first reference signal, and to increment said counter value when said inductor current detection signal decreases to a second reference signal;
a digital-analog conversion circuit for converting said counter value of said counter circuit to an analog signal as said maximum on time; and
an on-time judgment circuit for comparing said maximum on time with an actual on time of said power switch and generating said maximum on-time signal.

8. The control circuit according to claim 7, wherein said maximum on-time circuit comprises:
a clock signal generation circuit for generating a first clock signal for decrement so that said counter circuit counts in accordance with said first clock signal, and generating a second clock signal for increment so that said counter circuit counts in accordance with said second clock signal.

9. The control circuit according to claim 8, wherein frequencies of said first clock signal and said second clock signal are determined for said reference duty ratio.

10. The control circuit according to claim 9, wherein reference duty ratio is equal to a ratio of said frequency of said second clock signal to a sum of said frequency of said first clock signal and said frequency of said second clock signal.

11. The control circuit according to claim 7, wherein said maximum on-time circuit further comprises a comparator for comparing said inductor current detection signal with said first reference signal and said second reference signal.

12. The control circuit according to claim 11, wherein said first reference signal and said second reference signal are both equal to one half of said peak reference signal.

13. The control circuit according to claim 11, wherein said first reference signal is equal to said peak reference signal, and said second reference signal is zero.

14. A control method for a power converter, wherein said power converter comprises a power switch and an inductor being coupled to said power switch, said control circuit controls operation of said power switch to charge and discharge said inductor to provide an inductor current, so that an output current is provided, comprising:
controlling said power switch to be turned on when or after an inductor current detection signal is zero, and controls said power switch to be turned off when said inductor current detection signal reaches a peak reference signal or when said power switch has been turned on for a maximum on time,
wherein said control method adjusts said maximum on time in accordance with said inductor current detection signal so that said power converter provides a constant output current to a load.

15. The control method according to claim 14, wherein said input voltage of said power converter is a DC input voltage with an amplitude varying in a first cycle, said output current is equivalent to a DC output current which has an equivalent duty ratio and varies in said first cycle,
at said step of adjusting said maximum on time, controlling said equivalent duty ratio to be approximately equal to a reference duty ratio.

16. The control method according to claim 15, wherein said step of controlling said power converter to be turned on comprises: generating a turn-on signal when a zero crossing point of an inductor current detection signal is detected.

17. The control method according to claim 15, wherein said switch control signal has an second cycle less than said first cycle, said step of controlling said power switch to be turned on comprises: generating a turn-on signal when a predetermined time period has elapsed after said zero crossing point of said inductor current detection signal was detected, and maintaining a constant ratio of said time period during which said inductor current flows through said load to said second cycle.

18. The control method according to claim 15, wherein said step of adjusting said maximum on time comprises:
decrementing a counter value when said inductor current detection signal increases to a first reference signal, and incrementing said counter value when said inductor current detection signal decreases to a second reference signal;
converting counter value of said counter circuit to an analog signal as said maximum on time; and
comparing said maximum on time with an actual on time of said power switch and generating said maximum on-time signal.

19. The control method according to claim 18, wherein said step of adjusting said maximum on time comprises:
generating a first clock signal during said decrement period so that said counter circuit counts in accordance with said first clock signal, and generating a second clock signal during said increment period so that said counter circuit counts in accordance with said second clock signal.

20. The control method according to claim 19, wherein said step of adjusting said maximum on time comprises:
determining frequencies of said first clock signal and said second clock signal for said reference duty ratio.

21. The control method according to claim 20, wherein said reference duty ratio is equal to a ratio of said frequency of said second clock signal to a sum of said frequency of said first clock signal and said frequency of said second clock signal.

22. The control method according to claim 18, wherein said first reference signal and said second reference signal are both equal to one half of said peak reference signal.

23. The control method according to claim 18, wherein said first reference signal is equal to said peak reference signal, and said second reference signal is zero.

* * * * *